United States Patent [19]

Bouta

[11] Patent Number: 4,843,916
[45] Date of Patent: Jul. 4, 1989

[54] AUTOMATIC TRANSMISSION CONTROL APPARATUS RESPONSIVE TO TYPE OF ENGINE FUEL

[75] Inventor: Keiji Bouta, Hiroshima, Japan

[73] Assignee: 501 Mazda Motor Corporation, Hiroshima, Japan

[21] Appl. No.: 939,858

[22] Filed: Dec. 9, 1986

[30] Foreign Application Priority Data

Dec. 10, 1985 [JP] Japan .................. 60-275935

[51] Int. Cl.⁴ .................................. B60K 41/06
[52] U.S. Cl. ........................... 74/866; 74/733; 74/861; 123/425; 192/3.29
[58] Field of Search .............. 74/861, 856, 866, 867, 74/868, 869, 732, 733; 123/425, 435; 192/3.28, 3.29

[56] References Cited

U.S. PATENT DOCUMENTS

| | | | |
|---|---|---|---|
| 3,640,156 | 2/1972 | Mori et al. | 74/866 |
| 4,430,911 | 2/1984 | Morscheck | 74/861 X |
| 4,513,717 | 4/1985 | Kobayashi | 123/425 |
| 4,523,281 | 6/1985 | Noda et al. | 74/866 X |
| 4,528,955 | 7/1985 | Sugiura | 123/425 |
| 4,619,236 | 10/1986 | Okada et al. | 123/425 |
| 4,630,584 | 12/1986 | Higashiyama et al. | 123/425 |
| 4,677,878 | 7/1987 | Yamamori et al. | 74/861 |

FOREIGN PATENT DOCUMENTS

| | | | |
|---|---|---|---|
| 45922 | 2/1982 | European Pat. Off. | 74/868 |
| 138495 | 4/1985 | European Pat. Off. | 123/425 |
| 2625770 | 12/1977 | Fed. Rep. of Germany | 74/861 |
| 2023877 | 11/1978 | Fed. Rep. of Germany | 74/861 |
| 2524557 | 10/1983 | France | 123/425 |
| 138262 | 8/1983 | Japan | 123/425 |

Primary Examiner—Dwight G. Diehl
Attorney, Agent, or Firm—Wegner & Bretschneider

[57] ABSTRACT

A control apparatus for an automatic transmission detects, for example, octane values in order to determine the kind of gasoline used in the engine. The shift patterns of the automatic transmission are altered in accordance with the kind of fuel detected. This permits optimum running in accordance with the kind of fuel used. When a fuel of higher octane value is used, running can be carried out with priority on high output, while when a fuel lower in octane value is used, running can be carried out with an emphasis on the saving of gasoline.

16 Claims, 7 Drawing Sheets

AUTOMATIC TRANSMISSION CONTROL APPARATUS RESPONSIVE TO TYPE OF ENGINE FUEL

BACKGROUND OF THE INVENTION

1. Field of the Invention

The present invention relates to a control apparatus of an automatic transmission and, more particularly, to a control apparatus of an automatic transmission designed so as to alter shift patterns in accordance with the kind of fuel used.

2. Description of Prior Art

Generally, as an automatic transmission is widely employed one composed of a combination of a torque converter with a shifting mechanism of a multistage gear set with a gear mechanism such as a planetary gear mechanism.

The shifting control in such an automatic transmission utilizes usually a hydraulic pressure mechanism in which a hydraulic pressure circuit is changed over by an electromagnetic valve to operate a friction element such as a brake, clutch and so on as a hydraulic actuator accompanying with the multistage planetary gear shifting mechanism, thereby switching a system transmitting the engine power and providing a desired shifting range. To shift the hydraulic pressure circuit with the change-over valve, it is usually arranged so as to be selectively operated by means of shift-up signals or shift-down signals from an electronic control apparatus that permits the detection of the running state of a vehicle beyond a predetermined shifting line.

As such means for shifting gears on the basis of predetermined shift patterns, it is known that the shift patterns themselves are altered. U.S. Pat. No. 3,640,156 discloses the alteration of shift patterns in accordance with temperatures of an engine. Specifically, it is designed that a favorable operation efficiency of an engine is insured by altering the shift pattern so as to allow the engine rotations (vehicle speed) to become larger when the temperature of the engine is low.

As another example of altering shift patterns, U.S. Pat. No. 4,523,281 discloses an embodiment in which three shift patterns including a power mode, normal mode and economy mode are predetermined and either one can be arbitrarily selected by an operator's (driver's) choice. In this embodiment, the power mode puts an emphasis most on outputs shifted at a high rotational side while the economy on the saving of fuel or mileage. The normal mode is arranged to indicate a pattern between the other two modes. Furthermore, in this embodiment, the shifting mechanism is connected to an engine outputs shaft through a torque converter with a lockup clutch, enabling an arbitrary selection by means of a manual choice from the three modes including the power mode, economy mode or normal mode as an operating pattern of the lockup clutch, that is, as a lockup pattern.

Turning now to the kind of fuels, it is known that, for example, gasoline can be grouped into two kinds, regular gasoline and high octane gasoline. When compared to the regular gasoline, the high octane gasoline is high in the octane number so that problems with knocking may be reduced. Thus it is used for an engine of the high output type with a high compression ratio. Accordingly, it could be said that an operator (driver) who used high octane gasoline tends to prefer to a powerful running with high acceleration.

If fuels with different calorific values are employed, output characteristic of an engine may also be varied.

SUMMARY OF THE INVENTION

The first object of the present invention is to provide a control apparatus of an automatic transmission designed so as to enable an optimum running in accordance with the kind of fuels.

The second object of the present invention is to provide a control apparatus of an automatic transmission designed so as to enable the shift pattern to be altered in accordance with the kind of fuels by means of the manual operation of an operator's choice, too.

The third object of the present invention is to provide a control apparatus of an automatic transmission designed so as to permit an automatic alteration of the optimum shift pattern in accordance with the kind of the fuel by the automatic detection of the kind of the fuel used.

The fourth object of the present invention is to provide a control apparatus of an automatic transmission designed so as to permit the setting of an optimum lockup pattern in accordance with the kind of the fuel used.

The present invention is constructed basically as described in the appended claims, and the construction is indicated diagrammatically as in FIG. 1.

An automatic transmission to be used for the present invention may be of the type containing a torque converter that may be of the type in which a lockup clutch is mounted to connect a pump (converter input shaft) of the torque converter directly to a turbine (converter output shaft). The operation or relief of the lockup clutch may be effected on the basis of a predetermined lockup pattern, and it is desired to alter the lockup pattern in accordance with the kind of a fuel used.

A plurality of shift patterns in accordance with the kind of fuels may be stored in advance in memory means. In order to minimize the capacity (load) of the memory means, only one of the basic shift pattern may be used, for example, by multiplying the basic pattern by a given correction coefficient. Needless to say, the shift pattern may be set, for example, using a vehicle speed and an engine load as a parameter as have been generally done.

Detecting means for detecting the kind of a fuel used may be of the switch type capable of being operated manually by an operator. When the fuel used is a usual gasoline, a knocking sensor as have been conventionally used may be utilized because the knocking strength varies with octane number. A fuel with low octane number may cause knocking in a determined running range, particularly in a range of a low engine speed and a high engine load, leading to a rise in the knocking strength beyond a determined level. It is known that no knocking is caused, on the other hand, when a fuel with large octane number is used. Accordingly, if it is detected whether or not the knocking is caused in the determined running range, whether the octane number is large or small can be determined.

The kind of fuel may be classified by the performance rating of fuel, more particularly gasoline is classified by the octane number, and light oil is classified by the octane number. If a combination of gasoline with an alcohol is used, it may be classified by both of the two ratings.

Shifting control means may utilize a microcomputer as is conventionally used. The microcomputer contains a CPU, an ROM and an RAM therein. The shift pattern is stored in the ROM. Of course, the computer may be either of the digital type or of the analog type.

The other objects and advantages of the present invention will become apparent by the description of the following example with reference to the drawings.

BRIEF DESCRIPTION OF THE DRAWINGS

FIG. 4-1 is a diagram of an example of the shift map.

FIG. 4-2 is a diagram of an example of the lockup map.

FIG. 4-3 is a diagram of an alternative example of the shift map.

DETAILED DESCRIPTION OF PREFERRED EMBODIMENTS

Figure 2A:
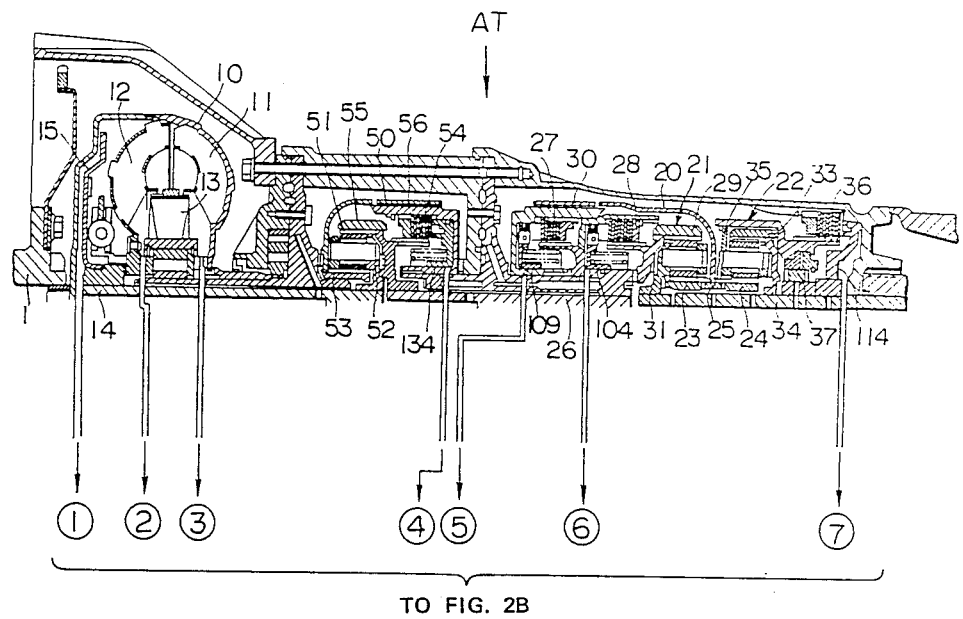
FIG. 2A is a cross sectional view illustrating the mechanical portion of the automatic transmission according to the present invention.

Referring to FIG. 2A, an automatic transmission AT is shown to include a torque converter 10, a multistage gear shifting system 20, and an overdrive planetary gear shifting system 50 arranged between the torque converter 10 and the multistage gear shifting system 20.

The torque converter 10 includes a pump 11 connected to an engine output shaft 1, a turbine 12 mounted so as to face the pump 11, and a stator 13 disposed between the pump 11 and the turbine 12. To the turbine 12 is connected a converter output shaft 14. A lockup clutch 15 is mounted between the pump 11 and the converter output shaft 14 and always energized in the engaging direction, that is, in the direction so as to lock up the engine output shaft 1 and the converter output shaft 14 by means of an operating hydraulic pressure circulating in the torque converter 10. And the lockup clutch 15 is constructed so as to be kept open (release) by means of an opening hydraulic pressure to be supplied from the outside.

The multistage gear shifting system 20 includes a front-stage planet gear system 21 and a rear-stage planet gear system 22. A sun gear of the front-stage planet gear system 21 is connected through a connecting shaft 25 to a sun gear 24 of the rear-stage planet gear system 22. An input shaft 26 of the multistage gear shifting system 20 is connected through a front clutch 27 to the connenting shaft 25 and through a rear clutch 28 to an internal gear 29 of the front-stage planet gear system 21. Between the connecting shaft 25, that is, the sun gears 23 and 24, and a transmission casing is mounted a front brake 30. A planetary carrier 31 of the front-stage planet gear system 21 and an internal gear 33 of the rear-stage planet gear system 22 are connected each to an output shaft 24. Between a planetary carrier 35 of the rear-stage planet gear system 22 and a transmission casing are disposed a rear brake 37 and a one-way clutch 37.

In the overdrive planetary gear shifting system 50, a planetary carrier 52 supporting rotatively a planetary gear 51 is connected to the converter output shaft 14 of the torque converter 10. A sun gear 53 is connected through a coupling clutch 54 to an internal gear 55 that in turn is connected to the input shaft 26 of the multistage gear shifting system 20. Between the sun gear 53 and the transmission casing is mounted an overdrive brake 56.

The multistage gear shifting system 20 may be of the conventional type constructed so as to automatically shifting modes with three forward speeds and one reverse speed. A desired shifting mode can be given by operating the clutches 27 and 28 and the brakes 30 and 36. When the coupling clutch 54 is engaged and the brake is relieved, the overdrive planetary gear shifting system 50 connects the converter output shaft 14 and the input shaft 26 in a coupled manner. To the contrary, when the brake 56 is engaged and the coupling clutch 54 is relieved, the overdrive planetary gear shifting system 50 allows the converter output shaft 14 and the input shaft 26 to be connected to each other in an overdrive manner (4th-speed).

Figure 2B:
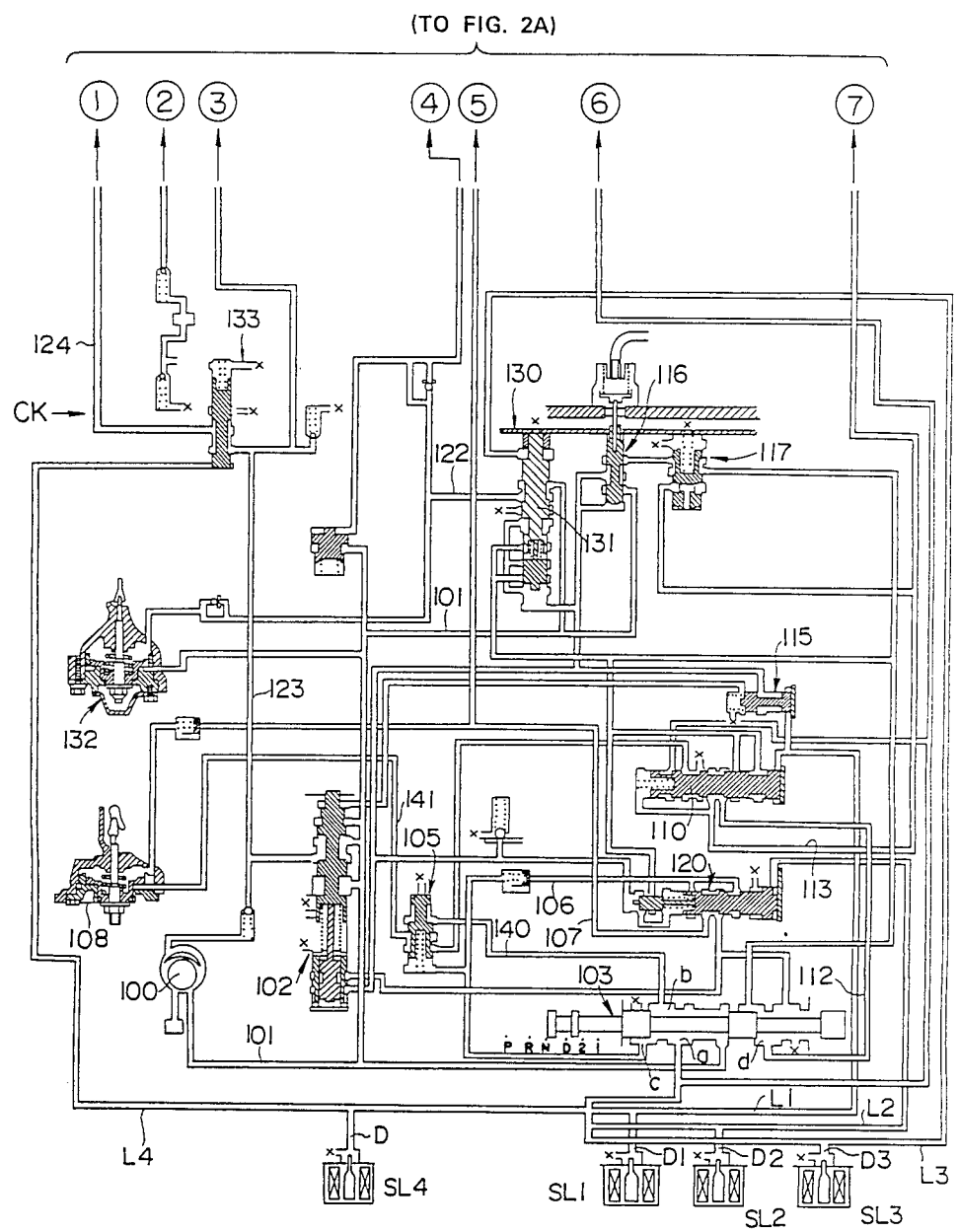
FIG. 2B is a diagram of a hydraulic pressure circuit of the automatic transmission according to the present invention.

The automatic transmission AT is equipped with a hydraulic pressure control circuit CK as shown in FIG. 2B. The hydraulic pressure control circuit CK is provided with an oil pump 100 to be driven by the engine output shaft 1. An operating oil forced out from the oil pump 100 to a pressure line 101 is subjected to pressure adjustment by a pressure control valve 102 and led to a selector valve 103. The selector valve 103 is designed so as to selectively shift different positions such as the first position 1, second position 2, drive position D, neutral position N, reverse position R, and parking position P. When the selector valve 103 is set to be at the first position 1, second position 2 or drive position D, the pressure line 101 is allowed to communicate with a port a, b, c of the selector valve 103, respectively. The port a is connected to an operating actuator 104 of the rear clutch 28, and the rear clutch 28 is kept in the engaged manner when the selector valve 103 is set at the positions as described above. The port a is also connected near the left end portion of a 1-2 shift valve 110 so as to actuate a spool in the right direction as shown in FIG. 2B. The port a is further connected to the right end of the 1-2 shift valve 110 through a first line L1, to the right end of a 2-3 shift valve 120 through a second line L2, and to the upper end of a 3-4 shift valve 130 through a third line L3.

From the first line L1, second line L2, and third line L3 branched drain lines D1, D2 and D3, respectively. The drain lines D1, D2 and D3 are connected to a first solenoid valve SL1, second solenoid valve SL2 and third solenoid valve SL3 to open or close the drain lines D1, D2 and D3, respectively. When the solenoid valves SL1, SL2 and SL3 are deenergized while the pressure line 101 communicates with the port a, the drain lines D1, D2 and D3, respectively, are closed, thus resulting in an increase in pressures with the first, second and third drain lines D1, D2 and D3.

The port b is connected to a second lock valve 105 through a line 140, thus enabling the pressure to actuate a spool of the second lock valve 105 downward as shown in FIG. 2B. When a spool of the second lock valve 105 is located at the lower position, the line 140 is caused to communicate with a line 141, thereby allowing the hydraulic pressure to lead to a pressure chamber on the engaging side of an actuator 108 of the front brake 30 and maintain the front brake 30 in the operating direction.

The port c is connected to the second lock valve 105, thus acting the pressure on a spool of the second lock valve 105 in the upward direction. The port c is further connected to the 2-3 shift valve 120 through a pressure line 106. The pressure line 106 is allowed to communicate with the line 107 when the spool of the 2-3 shift valve 120 is shifted to the left by the pressure that is elevated in the second line L2 upon deenergization of the second solenoid valve SL2 in the second drain line D2. The line 107 is connected to a pressure chamber on the releasing side of the actuator 108 of the front brake 30, thus enabling the actuator 108 to operate the front brake 30 in the releasing direction against the pressure in the pressure chamber on the engaging side thereof when the hydraulic pressure is introduced in the pressure chamber thereof. The pressure in the line 107 is also introduced into an actuator 109 of the front clutch 27 so as to be engaged with the front clutch 27.

The selector valve 103 is provided with the port d communicating with the pressure line 101 at the first position 1. The port d is connected through a line 112 to the 1-2 shift valve that in turn is connected through a line 113 to an actuator 114 of the rear brake 36. When the first solenoid valve SL1 and the second solenoid valve SL2 is deenergized by a given signal, the 1-2 shift valve 110 and the 2-3 shift valve 120 can shift each the spool to switch the line to operate a predetermined brake or clutch so as to shift from the first speed range to the second speed range and from the second speed range to the third speed range.

The hydraulic pressure control circuit CK is provided with a cut-back valve 115 for leveling off the hydraulic pressure from the pressure control valve 102, a vacuum throttle valve 116 for varying the line pressures from the pressure control valve 102 according to an intake air pressure, and a throttle backup valve 117 for backing the vacuum throttle valve 116 up.

In order to control the clutch 54 and the brake 56 of the overdrive planetary gear shifting system 50, the hydraulic pressure control circuit CK is provided with the 3-4 shift valve 130 and an actuator 132. A pressure chamber on the engaging side of the actuator 132 is connected to the pressure line 101, thereby allowing the pressure in the pressure line 101 to actuate the overdrive brake 56 in the engaging direction. Like the 1-2 shift valve 110 and the 2-3 shift valve 120, the 3-4 shift valve 130 is constructed so as to cause a spool 131 thereof to move in the downward direction to block the pressure line 101 and a line 122, whereby the line 122 is drained, when the third solenoid valve SL3 is deenergized. This causes the hydraulic pressure acting on the pressure chamber on the releasing side of the actuator 132 of the overdrive brake 56, thereby allowing the overdrive brake 56 to operate in the engaging direction and, at the same time, an actuator 134 of the coupling clutch 54 to release the coupling clutch 54.

The hydraulic pressure control circuit CK is further provided with a lockup control valve 133 that is communicating through a fourth line L4 with the port a of the selector valve 103. Like the drain lines D1, D2 and D3, a drain line with a fourth solenoid valve SL4 is branched off from the fourth line L4. When the fourth drain line DL4 is closed by deenergizing the fourth solenoid valve SL4 and the pressure in the line L4 is caused to be elevated, the lockup control valve 133 allows a spool thereof to block a line 123 and a line 124 and the lockup clutch 15 to be transferred in the operating direction by the draining of the line 124.

In the embodiments as described above, the operation relationships of each shifting position with each solenoid valve are shown in Table 1 below. The relationship of the fourth solenoid valve with the locking-up is shown in Table 2 below. The operation relationship of each shifting position with each clutch and brake are shown in Table 3 below.

TABLE 1

| Shifting position | First Solenoid | Second Solenoid | Third Solenoid |
| --- | --- | --- | --- |
| 1st-Spe | ON | ON | ON |
| 2nd-Spe | OFF | ON | ON |
| 3rd-Spe | OFF | OFF | ON |
| 4th-Spe | OFF | OFF | OFF |

TABLE 2

| Fourth Solenoid | Lockup |
| --- | --- |
| ON | Operated |
| OFF | Released |

TABLE 3

| | | Clutch 28 | Clutch 27 | Clutch 15 | Clutch 54 | Brake 36 | Brake 30 | Brake 56 | One-way Clutch 37 | Gear Ratio |
| --- | --- | --- | --- | --- | --- | --- | --- | --- | --- | --- |
| | P | | | | X | | | | | |
| | R | | X | | X | X | | | | 2.181 |
| | N | | | | X | | | | | |
| D | 1-spe | X | | | X | | | | X | 2.458 |
| | 2-Spe | X | | (X) | X | | X | | | 1.458 |
| | 3-Spe | X | X | (X) | X | | | | | 1.000 |
| | OD | X | X | (X) | | | | X | | 0.685 |
| | 2 | X | | | | | X | | | 1.458 |
| 1 | 1-Spe | X | | | | X | X | | | 2.458 |
| | 2-Spe | X | | | | | | X | | 1.458 |

Figure 3:
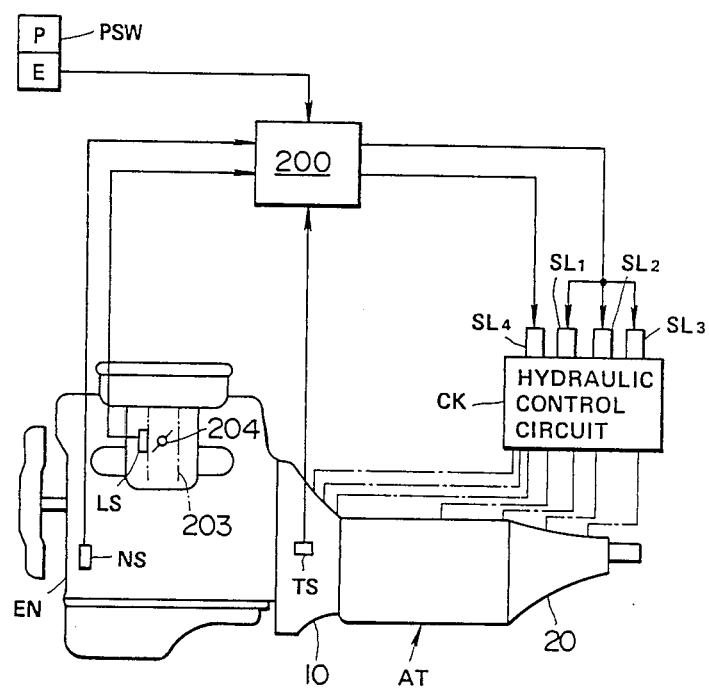
FIG. 3 is a schematic view of an overall arrangement of one example according to the present invention.

FIG. 3 shows an example of a control apparatus of the automatic transmission AT according to the present invention in which the shifting control and the lockup control are carried out by controlling the hydraulic pressure control circuit CK accompanied by the automatic transmission AT. An engine EN with which the automatic transmission AT is assembled is also shown therein.

Referring to FIG. 3, a control unit 200 is constructed so as to include a lockup circuit for carrying out the lockup control of the automatic transmission AT and a shifting control circuit for carrying out the shifting control therefor. The number of rotations of the converter output shaft 14 of the torque converter 10 for the automatic transmission AT, that is, the turbine speed Tsp, is detected by a sensor TS for sensing the number of turbine rotations mounted thereon. A throttle opening TH of a throttle valve 204 mounted in an intake passage 203 of the engine EN is detected by a engine load sensor LS. Signals from the sensor TS and the engine load sensor LS are supplied to the control unit 200.

In the control unit 200, the turbine speed Tsp is treated as information corresponding to a vehicle speed, and the throttle opening TH is treated as information corresponding to the engine load.

To the control unit 200 are supplied signals from a knocking sensor NS mounted in a cylinder block and from a pattern selection switch PSW for the shift pattern or shift characteristics as will be described below. The knocking sensor NS is designed so as to detect the occurrence of knocking by detecting the detection of a vibration of the cylinder block. In this embodiment according to the present invention, whether the knocking is occurred or not is treated as information to determine whether a high octane gasoline is used or whether a regular gasoline is used.

The shifting control circuit of the control unit 200 is arranged so as to compute whether the shifting should be done by comparing the signals of the turbine speed from the sensor TS for sensing the number of turbine rotations, the signals of the throttle opening from the engine load sensor LS and a running mode sensor (not shown) for detecting the running modes with the shifting-up line and the shifting-down line of a predetermined shift map. The shift-up signals and the shift-down signals according to the computation results are supplied to the first solenoid valve SL1, second solenoid valve SL2 or third solenoid valve SL3 of the hydraulic pressure control circuit CK. As each of the solenoid valves is selectively energized according to the manner as illustrated in Table 1 above, the shifting positions of the automatic transmission AT are controlled so as to move from the upper shifting range (shift-up) to the lower shifting range (shift-down), and the shift-up signals or the shift-down signals are supplied to the lock control circuit.

Figure 1:
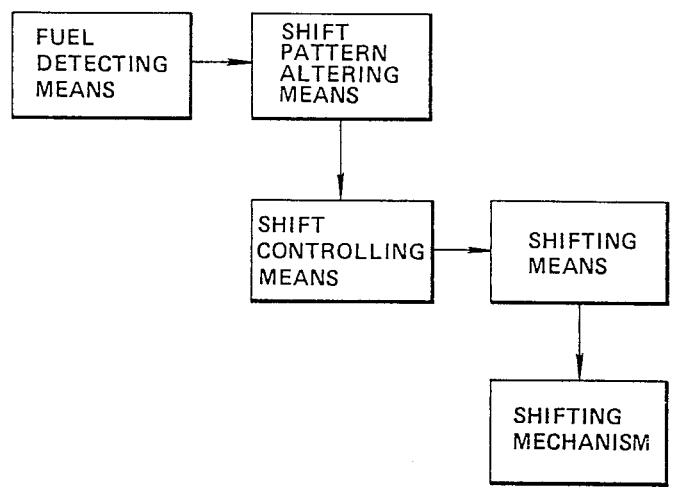
FIG. 1 is a functional block diagram of an overall arrangement of the control apparatus of the automatic transmission according to the present invention.
Figures 1, 4:
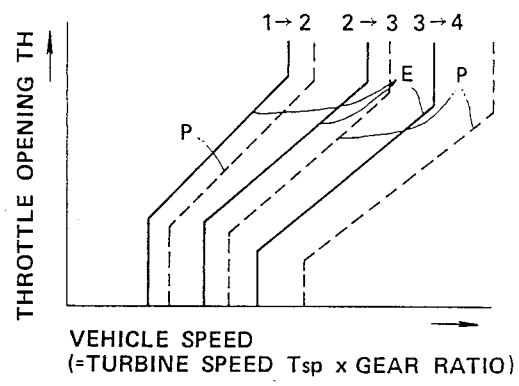

A shift map to be employed here contains an economy map (E map) as indicated by the solid lines E in FIG. 4-1 and a power map (P map) as indicated by the broken line P in FIG. 4-1 arranged on the basis of a vehicle speed obtained by multiplying the turbine speed by the gear ratio and a throttle opening (under an engine load). The power map is designed so as to provide a spare driving power by enlarging a running range at a relatively high shifting ratio to a higher speed side as a result that the shifting-up line is shifted to the high shifting side by enlarging a running range at the low shifting range to a higher shifting side as compared to the economy map.

As in the shifting control circuit, the lockup control circuit of the control unit 200 is designed to compute the operation or relief of the locking-up by comparing information represented by the turbine speed Tsp from the sensor TS for the turbine rotation number, the throttle opening signals from the engine load sensor LS and the running mode signals with the lockup operating line and the lockup relieving line of a predetermined lockup based on the turbine speed—engine load patterns. The lockup operating patterns or lockup relieving signals are supplied to the fourth solenoid valve SL4 of the hydraulic pressure control circuit CK in accordance with the computation results.

Figures 2, 4:
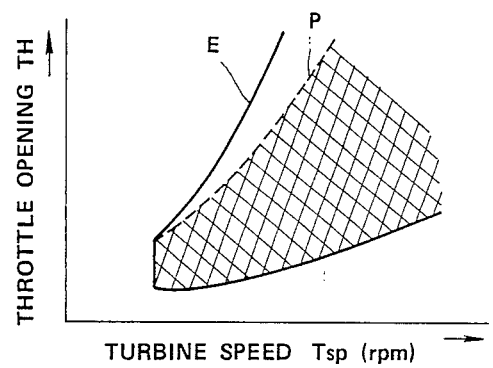
Figures 3, 4:
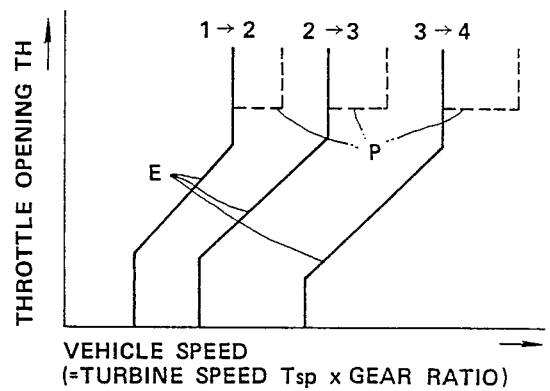

The lockup map to be used here contains an economy map as indicated by the solid line E in FIG. 4-2 and a power map as indicated by the broken line P in FIG. 4-2, both computed on the basis of the turbine speed Tsp and the throttle opening (under engine load) as indicated in FIG. 4-2. The power map is designed so as to provide a sparedriving power by enlarging the lockup relieving range at a high load compared to the economy map.

FIG. 4-3 shows an example of variations from the shifting map described above, which is designed so as to differentiate in modes in a high engine load range, that is, in the kick-down range. This permits the setting of the power mode that can maintain a favorable mileage in the constant running range and, at the same time, increase outputs in the full open range.

The control unit 200 as described above may be composed of, for example, a microcomputer. A brief description of the control made by the control unit 200 will be briefly described herein below.

Figure 5:
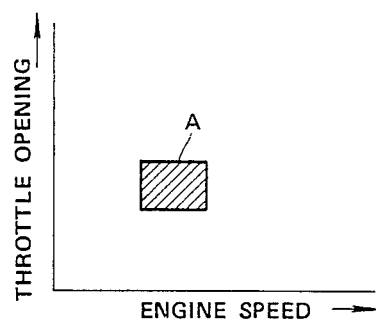
FIG. 5 is a diagram of a running range utilizable for the detection of the kind of gasoline.

As shown in FIG. 5, it is known that there is a range, generally in such a range as a low engine speed and a high engine load, as indicated here by the capital letter "A" in which, if a regular gasoline is compared to a high octane gasoline, the regular gasoline may cause the knocking whereas the high octane gasoline may not cause any knocking due to the difference of the octane number. Accordingly, the detection of the presence or absence of knockings occured in the range A may detect whether a regular gasoline is used or whether a high octane gasoline is used. And if it is detected that the high octane is used, the power map (P map) is selected as a shifting pattern.

More specifically, in this example that utilizes two different patterns capable of being switched to the economy map (E map) or to the power map (P map) in accordance with the shift pattern alteration by a pattern selection switch PSW, that is, in accordance with an operator's selection, the control may be effected to select the power map (P map) prior to the selection by means of the pattern selection switch PSW on the basis of information obtained by the detection of the kind of gasoline from the difference in the octane number when the high octane gasoline is used.

Figure 6:
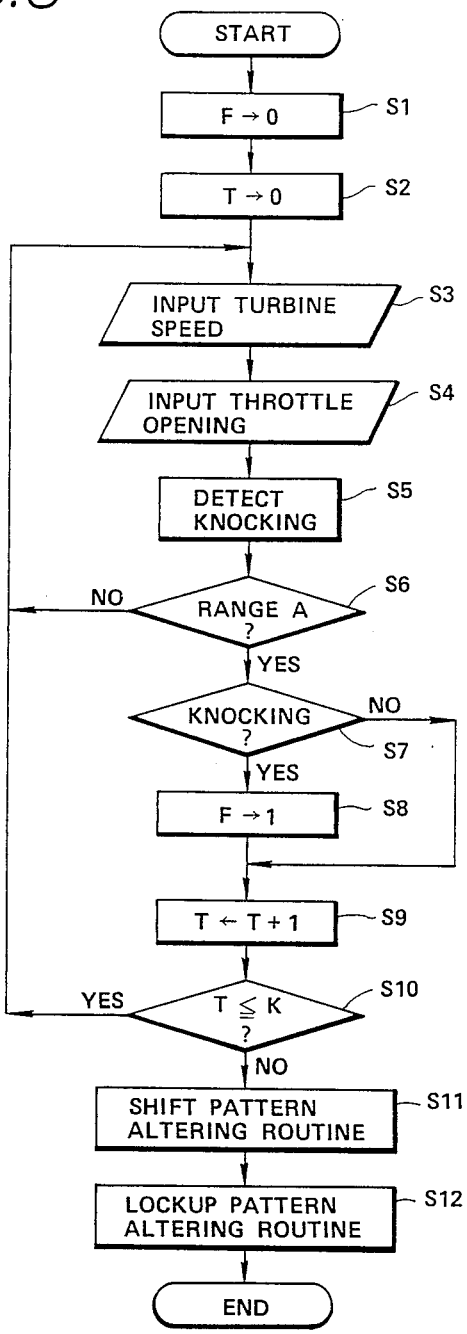
FIG. 6 is a flow chart illustrating an example of the control processing in detecting the kind of gasoline.
Figure 7:
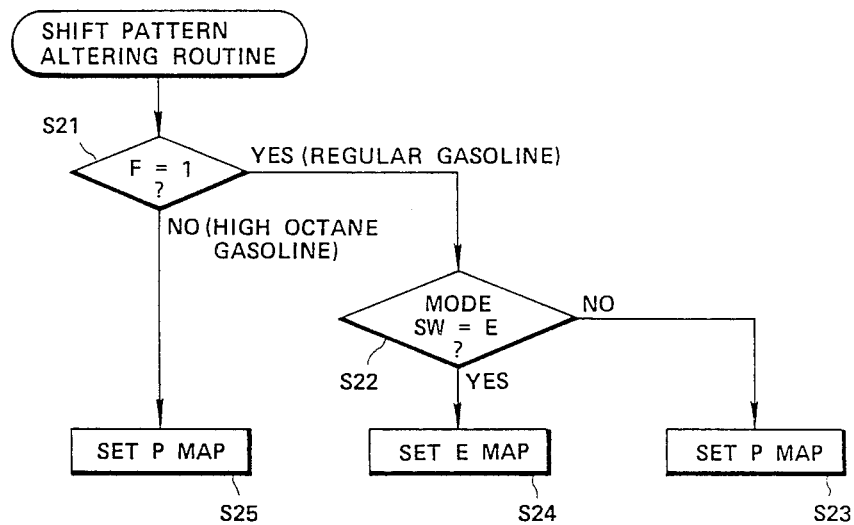
FIG. 7 is a flow chart illustrating an example of the control processing of the shift pattern alteration.
Figure 8:
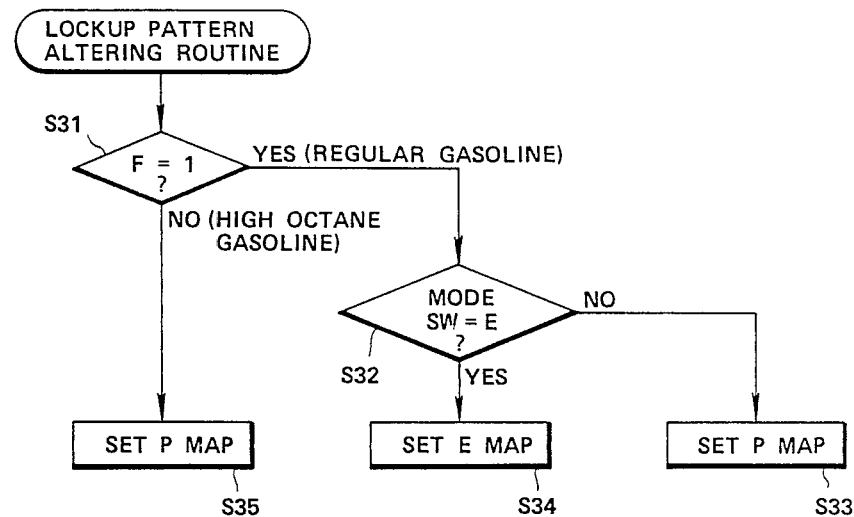
FIG. 8 is a flow chart illustrating an example of the control processing of the lockup pattern alteration.

The control may be performed according to flow charts as indicated in FIGS. 6, 7 and 8.

Detection of the Kind of Gasoline Used

Turning first to FIG. 6, a flag F is set to "0" in step S1 and a time T is also set to "0" in step S2. In this example, the flag F is designed so as to correspond to a high octane gasoline when the flag F is set to be "0" while corresponding to a regular gasoline when it is set to be "1". The turbine speed is then input in step S3, and a throttle opening TH is input in step S4. In step S5, information supplied from the knocking sensor NS is input.

In step S6, it is determined whether both the engine speed (which is related to the turbine speed Tsp) and the throttle opening TH are located in the range referred to as "A" in FIG. 5. If YES in step S6 or they are in the range A, the flow advances to step S7 whether the knocking is caused to occur or not. If NO in step S6, the flow returns to step S3 and the operations after step S3 are repeated. If YES in step S7, that is, it is detected that the knocking is caused to occur, the flow proceeds to step S8 where the flag F is set to "1" as the regular gasoline is used. After the flag is set to "1" in step S8 or if NO in step S7 or no knocking is detected there, the timer T is count up in step S9. In step S10, a time K used is checked and the time K is equal to or longer than the timer T, then the flow returns to step S3 and the operations after step S3 are repeated as described above. If the time K is shorter than the timer T in step S10, the flow advances to a shift pattern altering routine in step S11 as shown in FIG. 7 and a lockup pattern altering routine in step S12 as shown in FIG. 8.

Alteration of Shift Patterns

Turning now to FIG. 7, the flag F is first checked in step S21. If the flag F is "1" or if it is detected that the regular gasoline is used, the flow proceeds to step S22 and a shift map is selected to either the P map in step S23 or the E map in step S24 in accordance with the selection by means of the pattern selection switch PSW. That is, if the mode SW is set to E in step S22, the economy map (E map) is set in step S24. If the mode SW is not set to E there, the power map (P map) is set in step S23.

On the other hand, if the flag F is "0" in step S21 or if it is detected that the high octane gasoline is used, the power map (P map) is set in step S25 regardless of the state in which the pattern selection switch PSW is located.

Alteration of Lockup Patterns

Turning to FIG. 8, the flag F is first checked in step S31. If the flag F is "1" or if it is detected that the regular gasoline is used, the flow proceeds to step S32 and a shift map is selected to either the P map is step S33 or the E map in step S34 in accordance with the selection by means of the pattern selection switch PSW. That is, if the mode SW is set to E in step S32, the economy map (E map) is set in step S34. If the mode SW is not set to E there, the power map (P map) is set in step S33.

On the other hand, if the flag is "0" in step S31 or if it is detected that the high octane gasoline is used, the power map (P map) is set in step S35 regardless of the state in which the pattern selection switch PSW is located.

What is claimed is:

1. An automatic transmission control apparatus comprising:
    shifting means for controlling a supplying of pressurized fluid to a hydraulic actuator adapted to operate the shifting of a shifting mechanism;
    means for determining vehicle speed;
    means for determining engine load;
    fuel detecting means for detecting whether a first kind of fuel is used or a second kind of fuel is used, the first kind of fuel having higher octane than the second kind of fuel;
    shift controlling means for controlling said shifting means in an economy mode and a power mode based on a predetermined shift pattern, the shift pattern for each of said economy mode and power mode having plural shift lines set using the vehicle speed and the engine load as parameters, at least one of said plural shift lines for the power mode being at a higher vehicle speed range than the corresponding shift line for the economy mode; and
    shift pattern altering means for altering the shift pattern to be used by said shift controlling means in response to an output from said fuel detecting means so as to select a power mode when the first kind of fuel is used and to select an economy mode when the second kind of fuel is used.

2. An automatic transmission control apparatus as claimed in claim 1, further comprising mode selecting means for manually selecting either said power mode or economy mode; and
    wherein said shift pattern altering means is arranged so as to select said power mode regardless of a selection made by said mode selecting means when said fuel detecting means detects the first kind of fuel.

3. An automatic transmission control apparatus as claimed in claim 1, wherein said fuel detecting means comprises a knocking sensor for detecting knocking of an engine so as to determine whether the first kind of fuel or the second kind of fuel is used in accordance with a degree of the knocking detected.

4. An automatic transmission control apparatus as claimed in claim 3 wherein said fuel detecting means senses the degree of the knocking in a predetermined running range.

5. An automatic transmission control apparatus as claimed in claim 4, wherein said running range is a range of lower engine speed and high engine load.

6. An automatic transmission control apparatus as claimed in claim 1, further comprising
    said shifting mechanism and an engine output shaft connected to said shifting mechanism through a torque converter with a lock-up clutch;
    lock-up controlling means for controlling said lock-up clutch on the basis of predetermined lock-up patterns; and
    lock-up pattern altering means for altering the lock-up patterns to be used for said lock-up controlling means depending on whether the first kind of fuel or the second of fuel is used.

7. An automatic transmission control apparatus comprising:
    shifting means for controlling a supply of pressurized fluid to a hydraulic actuator adapted to operate the shifting of a shifting mechanism;
    means for determining vehicle speed;
    means for determining engine load;
    fuel detecting means for detecting a kind of fuel; and
    shift controlling means for controlling said shifting means based on a predetermined shift pattern, said shift pattern comprising plural shift lines set by using the vehicle speed and the engine load as parameters; and
    shift pattern altering means for altering the shift pattern to be used by said shift controlling means in accordance with the kind of fuel in response to an output from said fuel detecting means, for at least one of said plural shift lines, the shift pattern is altered only when the engine load is higher than a predetermined value.

8. An automatic transmission control apparatus as claimed in claim 7, wherein
    said fuel detecting means detects whether a first kind of fuel is used or a second kind of fuel is used, the first kind of fuel having higher octane than the second kind of fuel;
    said shift pattern altering means is set so as to select a power mode when the first kind of fuel is used and to select an economy mode when the second kind of fuel is used;

at least one of said shift lines in said power mode has an expanded kick-down area so as to downshift with an engine load smaller than the corresponding shift line in said economy mode.

9. An automatic transmission control apparatus as claimed in claim 8, further comprising
   mode selecting means for manually selecting either said power mode or economy mode; and
   wherein said shift pattern altering means is arranged such that said power mode is selected regardless of a selection made by said mode selecting means when said fuel detecting means detects the first kind of fuel.

10. An automatic transmission control apparatus as claimed in claim 7, wherein said fuel detecting means comprises a knocking sensor for detecting knocking of an engine so as to determine the kind of the fuel in accordance with a degree of the knocking detected.

11. An automatic transmission control apparatus as claimed in claim 7 further comprising
   said shifting mechanism and an engine output shaft connected to said shifting mechanism through a torque converter with a lock-up clutch;
   lock-up controlling means for controlling said lock-up clutch on the basis of predetermined lock-up patterns; and
   lock-up pattern altering means for altering the lock-up patterns to be used for said lock-up controlling means in accordance with the kind of fuel detected by said fuel detecting means.

12. An automatic transmission control apparatus comprising:
   a shifting means for controlling a supply of pressurized fluid to a hydraulic actuator adapted to operate the shifting of a shifting mechanism;
   shifting controlling means for controlling said shifting means based on a predetermined shift pattern;
   fuel detecting means for detecting a kind of fuel;
   a torque converter with a lock-up clutch arranged between said shifting mechanism and an engine output shaft;
   lock-up controlling means for controlling said lock-up clutch on the basis of predetermined lock-up patterns;
   lock-up pattern altering means for altering the lock-up patterns to be used by said lock-up controlling means in accordance with the kind of the fuel detected by said fuel detecting means.

13. An automatic transmission control apparatus as claimed in claim 12, wherein said lock-up patterns comprise an economy mode and power mode, and wherein a lock-up area of the power mode is narrower than a lock-up area of the economy mode.

14. An automatic transmission control apparatus as claimed in claim 13, further comprising means for determining engine speed and engine load, wherein the lock-up area is narrower in the power mode than in the economy mode when the engine speed is low and the engine load area is high.

15. An automatic transmission control apparatus as claimed in claim 12, wherein
   said fuel detecting means detects whether a first kind of fuel is used or a second kind of fuel is used, the first kind of fuel having higher octane than the second kind of fuel; and
   said lock-up pattern altering means is set so as to select the power mode when the first kind of fuel is detected by said fuel detecting means.

16. An automatic transmission control apparatus as claimed in claim 15, further comprising
   mode selecting means for manually selecting either said power mode or economy mode; and
   wherein said lock-up pattern altering means is arranged such that said power mode is selected regardless of a selection made by said mode selecting means when the first kind of fuel is detected by said fuel detecting means.

* * * * *